(12) United States Patent
Swart

(10) Patent No.: US 10,231,078 B1
(45) Date of Patent: Mar. 12, 2019

(54) BLUETOOTH LOW ENERGY (BLE) REAL-TIME LOCATION SYSTEM (RTLS) HAVING SIMPLE TRANSMITTING TAGS, BEACONS AND BRIDGES, THAT USE A COMBINATION OF MOTION DETECTION AND RSSI MEASUREMENTS TO DETERMINE ROOM-LOCATION OF THE TAGS

(71) Applicant: Infinite Leap, Inc., Fargo, ND (US)

(72) Inventor: John A. Swart, Grand Rapids, MI (US)

(73) Assignee: Infinite Leap, Inc., Fargo, ND (US)

(*) Notice: Subject to any disclaimer, the term of this patent is extended or adjusted under 35 U.S.C. 154(b) by 0 days.

(21) Appl. No.: 16/010,732

(22) Filed: Jun. 18, 2018

Related U.S. Application Data

(63) Continuation-in-part of application No. 15/610,072, filed on May 31, 2017, now Pat. No. 10,028,105.

(Continued)

(51) Int. Cl.
| | |
|---|---|
| H04W 24/00 | (2009.01) |
| H04W 4/02 | (2018.01) |
| G08B 13/24 | (2006.01) |
| H04W 4/80 | (2018.01) |
| H04W 8/00 | (2009.01) |
| H04L 29/08 | (2006.01) |
| H04M 1/725 | (2006.01) |
| H04W 64/00 | (2009.01) |

(52) U.S. Cl.
CPC .......... *H04W 4/02* (2013.01); *G08B 13/2462* (2013.01); *H04W 4/80* (2018.02); *H04W 8/005* (2013.01); *H04L 29/08657* (2013.01); *H04M 1/72519* (2013.01); *H04M 1/72522* (2013.01); *H04W 64/00* (2013.01)

(58) Field of Classification Search
CPC ....... H04W 4/02; H04W 8/005; H04W 88/02; H04W 64/00; H04W 8/245; G08B 13/2462; H04M 1/72519; H04M 1/72522; H04L 29/08657; G06K 7/0008; G06K 19/0723
USPC ............................ 455/456.1, 456.5, 550.1
See application file for complete search history.

(56) References Cited

U.S. PATENT DOCUMENTS 9,810,767 B1    11/2017 Hamilton
9,877,298 B1 *  1/2018 Knas .................... H04W 64/00
(Continued)

*Primary Examiner* — Danh C Le
(74) *Attorney, Agent, or Firm* — Frank M. Scutch, III

(57) ABSTRACT

A real-time location system (RTLS) uses Bluetooth Low Energy (BLE) transmitting tags, bridges, and beacons. The fixed beacons broadcast BLE advertisements containing motion-status information about recent history of perceived motion in a room as determined from a motion sensor in the beacon. The bridges forward the beacon's received advertisements to a location engine, which records timestamps of motion events seen by each beacon in each room. One or more simple transmitting tags then report their own motion status based on a tag-based accelerometer. The system utilizes a series of location-engine steps, to estimate the room-location of the tags based on a specific combination of RSSI analysis, and a comparison of tag-motion history to the perceived and recorded motion-status in a room. This analysis of tag-motion history and motion-in-room status produces a better estimate of room-level location of the tag than can be estimated by simple proximity or multi-lateration using radio signal strengths.

5 Claims, 3 Drawing Sheets

Related U.S. Application Data

(60) Provisional application No. 62/343,242, filed on May 31, 2016, provisional application No. 62/623,561, filed on Jan. 30, 2018.

(56) References Cited

U.S. PATENT DOCUMENTS

| | | | |
|---|---|---|---|
| 2007/0046434 A1 | 3/2007 | Chakraborty | |
| 2011/0072132 A1 | 3/2011 | Shafer | |
| 2011/0080267 A1 | 4/2011 | Clare | |
| 2013/0141233 A1 | 6/2013 | Jacobs | |
| 2013/0201003 A1 | 8/2013 | Sabesan | |
| 2013/0281084 A1* | 10/2013 | Batada | H04W 4/043 455/426.1 |
| 2013/0324147 A1* | 12/2013 | Ong | H04W 64/00 455/456.1 |
| 2014/0351498 A1 | 11/2014 | Hsueh | |
| 2015/0002274 A1* | 1/2015 | Sengstaken, Jr. | G06K 7/10009 340/10.34 |
| 2015/0063427 A1* | 3/2015 | Cahn | H04B 1/707 375/146 |
| 2015/0063472 A1 | 3/2015 | Chatterton | |
| 2015/0341331 A1* | 11/2015 | Weksler | H04L 63/08 726/4 |
| 2016/0029160 A1* | 1/2016 | Theurer | H04W 4/02 455/456.1 |
| 2016/0142884 A1* | 5/2016 | Sears | H04W 40/244 455/404.2 |
| 2016/0260301 A1* | 9/2016 | Miller | G08B 13/2417 |
| 2016/0261986 A1* | 9/2016 | Nord | H04W 4/023 |
| 2016/0295358 A1 | 10/2016 | Cariss | |
| 2016/0295376 A1 | 10/2016 | Geng et al. | |
| 2016/0299213 A1* | 10/2016 | Jones | G01S 5/08 |
| 2017/0006417 A1* | 1/2017 | Canoy | H04L 63/126 |
| 2017/0032354 A1* | 2/2017 | Tilahun | G06Q 20/3223 |
| 2017/0111763 A1* | 4/2017 | Morgan | H04W 4/029 |
| 2017/0142549 A1 | 5/2017 | Herbert | |
| 2017/0142639 A1* | 5/2017 | Meredith | H04W 48/10 |
| 2017/0150321 A1* | 5/2017 | Ciecko | H04W 4/029 |
| 2017/0313426 A1 | 11/2017 | Morin | |

* cited by examiner

BLUETOOTH LOW ENERGY (BLE) REAL-TIME LOCATION SYSTEM (RTLS) HAVING SIMPLE TRANSMITTING TAGS, BEACONS AND BRIDGES, THAT USE A COMBINATION OF MOTION DETECTION AND RSSI MEASUREMENTS TO DETERMINE ROOM-LOCATION OF THE TAGS

CROSS-REFERENCE TO RELATED APPLICATIONS

This application is a continuation-in-part (CIP) and claims priority under 35 U.S.C. § 120 to U.S. application Ser. No. 15/610,072 filed on May 31, 2017 which claims priority to Provisional application Ser. No. 62/343,242 filed on May 31, 2016. This application also claims priority under 35 U.S.C § 119(e) to Provisional application Ser. No. 62/623,561 filed on Jan. 30, 2018. Applicant also claims priority to co-pending patent application Ser. No. 16/010,747, entitled "A BLUETOOTH LOW ENERGY (BLE) REAL-TIME LOCATION SYSTEM (RTLS) HAVING TAGS, BEACONS AND BRIDGES, THAT USE A COMBINATION OF MOTION DETECTION AND RSSI MEASUREMENTS TO DETERMINE ROOM-LOCATION OF THE TAGS" filed concurrently herewith. All of these applications are owned by Infinite Leap, Inc. and are incorporated by reference in their entireties.

FIELD OF THE INVENTION

The present invention relates generally to a real-time location system (RTLS) and more particularly to a Bluetooth Low Energy (BLE) RTLS having stationary beacons that advertise, active tags that transmit BLE advertisements, and bridges that pass tag-location information to a location algorithm in a central server.

BACKGROUND OF THE INVENTION

RTLS systems estimate locations for moving tags within a floor plan of interior rooms, in buildings such as hospitals. Many existing RTLS systems based on radio-frequency signals such as Wi-Fi or BLE, are designed to have moving tags that transmit a radio message, in a field of receiving devices called gateways, sensors, bridges, or Access Points. The network of gateways will use received signal strength of radio transmissions from a tag, as a proxy for estimating the distance between the tag and each gateway and use proximity or multi-lateration algorithms to estimate the locations of tags.

These approaches having tags that transmit, and location engines that are based only on multi-lateration, are standard in the industry, and provide location estimates that are acceptable for may use cases in industrial and manufacturing environments. But they fail to provide a highly accurate, room-level location fix for the environments that need to estimate which room an asset resides in, like hospitals.

RTLS systems in current use feature tags that wirelessly transmit advertisements into a field of fixed receivers, often named sensors, gateways or bridges. They attempt to locate tags by estimating a location on a floor plan (known as an (x,y) location fix for the map coordinates). Through a locating process known as multi-lateration, the one or more bridges measure the received signal strength (RSSI) of the advertisement they hear from a tag and forward that RSSI to a location engine. The location engine uses the received signal strength as an estimate of the distance between the tag and each reporting bridge, and the multi-lateration algorithm estimates the location of the tag on a floor plan by reporting the location as an (x,y) location on the floor plan. The distance between the estimated (x,y) location of the tag and its true (x,y) location on the floor plan may be called the "error". Current RTLS vendors measure their typical error (or "typical accuracy") in feet or meters. The typical error of an RTLS system is defined by a statistical population distribution of a large number of sample location estimates and their "error" measurements. Hence, RTLS-equipment vendors will often state their "typical error" or "typical accuracy" with phrases like "We are achieving 1-meter accuracy 90% of the time".

These current systems and methods of locating asset, patient and staff tags are insufficient for some hospital use cases. For example, often people and assets are located in two adjacent rooms in a hospital. One room is used to store clean equipment and the other used to store soiled equipment. Nurses need to use clean equipment to serve patients, of course, and never use soiled equipment. The clean equipment is often stored on shelves in the clean-equipment room, so imagine 50 pieces of clean equipment on a shelf that is attached to the wall that is shared with the soiled-equipment room. The adjacent soiled-equipment room also has shelves, on the opposite side of the wall, containing 50 pieces of soiled equipment. The assets all sit on shelves about six inches from the shared wall, so they are within 12 inches of the adjacent room. In this example, all 100 pieces of equipment have attached RTLS tags. The challenge of the RTLS system is to locate each piece of equipment and reliably tell the nurses which equipment is in the clean room (so it can be used) versus which equipment is in the soiled room (which cannot be used on a patient until it is cleaned and moved to the clean room).

An RTLS which uses only radio signal strength will almost always fail to discriminate the precise room-location of all 100 pieces of equipment. It may be able to locate each tag to within one meter of its true location, but it cannot tell whether the asset is one meter to the left of the wall, or one meter to the right of the wall, so it misplaces the room estimate for some assets. Thus, new solutions are required to better locate and track these assets.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
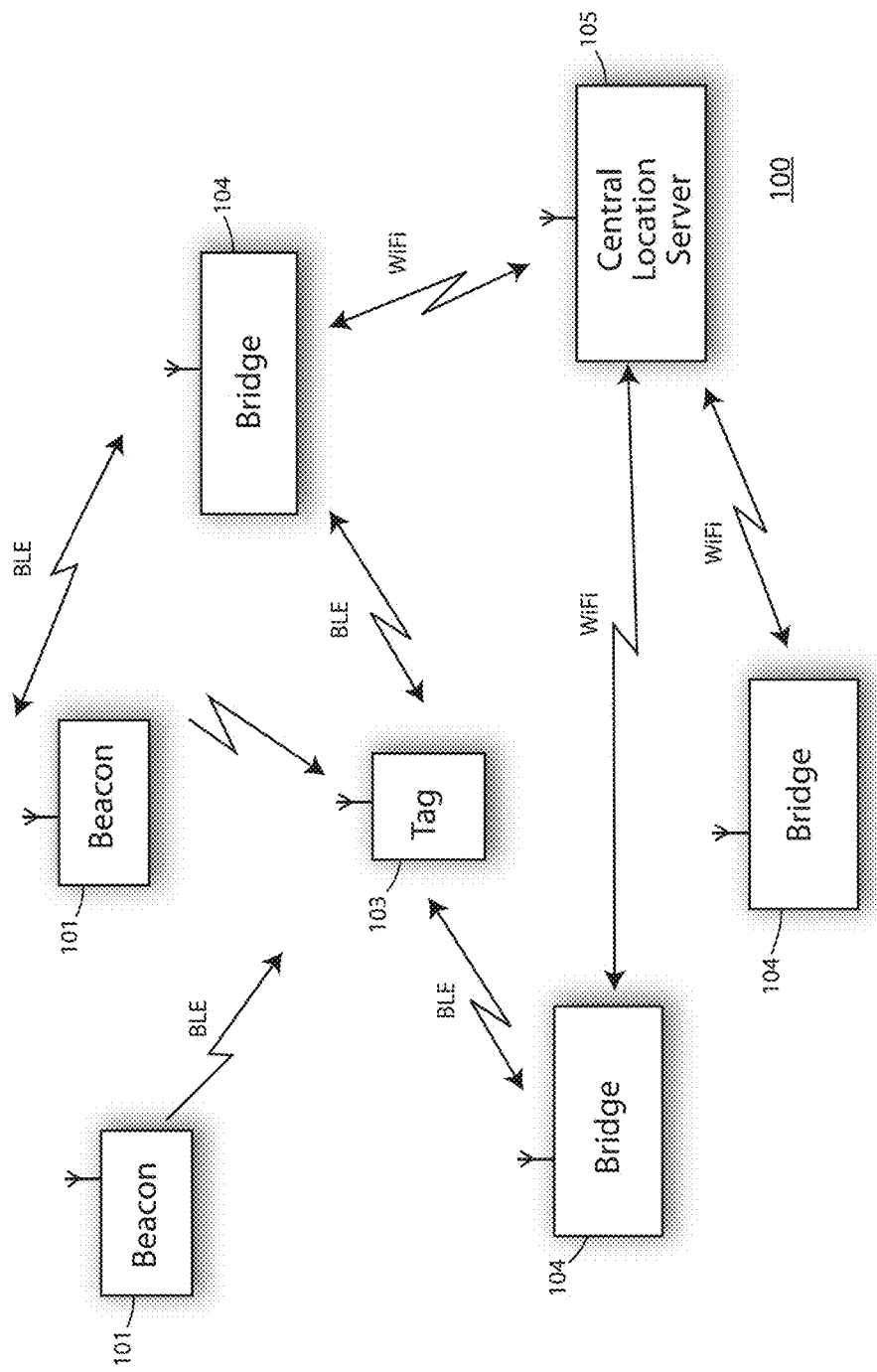
FIG. 1 a block diagram illustrating components in an RTLS, including tags, bridges, beacons, and a location engine.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an RTLS having stationary beacons that advertise, active tags that transmit BLE advertisements, and bridges that pass beacon and tag information to a location algorithm in a central server. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of RTLS having tags, bridges, and beacons. The non-processor circuits may include, but are not limited to, a radio receiver, a radio transmitter, signal drivers, clock circuits, power source circuits, and user input devices. As such, these functions may be interpreted as steps of a method to perform energy-harvesting tags, bridges with mode-instruction, and tags, bridges and beacons that self-report location changes. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 a block diagram illustrating components used in the BLE RTLS in accordance with various embodiments of the invention. The system 100 includes one or more fixed (in-room) beacon transmitters 101 that operate using a BLE signal transmission on one to three channels which contains a report of motion-status of moving objects in the beacon's room, as determined by a motion sensor in the beacon, a transmission that is received by a fixed infrastructure of bridges 104 and relayed to a central location server 105, constructing a database of in-room beacons and the reported motion status patterns of their rooms. The motion status reported in the beacon's advertisement is at least one bit that toggles to represent "I see motion (in my room)" or "I see no motion (in my room)" and may also be several bits to include a description of how much motion is seen, and indicators of recent history of motion-state transitions. The history of motion status may indicate that there was no motion 1 minute ago, but there is motion now. One or more tags 103 transmit a radio signal containing the tag's motion status to one or more bridges in a fixed infrastructure 104. For a tag, the motion status is either a bit that says it is moving (or not), or numerical readings from its onboard accelerometer, or an increased transmission rate that implies that the tag is in motion. The bridge retransmits the received signal strength of the tag's message, and the tag's motion status, via Wi-Fi to a central location server 105. As is already typical in the industry, the central location server may employ trilateration algorithms on the signal strength reports it receives from multiple bridges to form one estimate of the location of the tag. The central location server 105 also processes the content of the tag's motion-status message, comparing it to the coincident motion status reported by the fixed beacons 101. All of this information, including signal strengths of tag transmissions heard at the bridges, and coincident motion reports from the tags and fixed beacons, is factored into the location algorithm at the central location server. The central location server produces a "location estimate" for the tag, which is defined as an estimate of which room in the building the tag is located in.

Thus, the system in FIG. 1 includes a novel feature not taught in the prior art namely; a system of beacons, tags, bridges and a location engine, which enables the location engine to combine two location estimates: one multi-laterated location estimate based on radio signals, and a second location estimate based on motion status of tags and motion reports of in-room beacons; to produce a combined location estimate, used to store a updated, estimated location of the tag.

Figure 2:
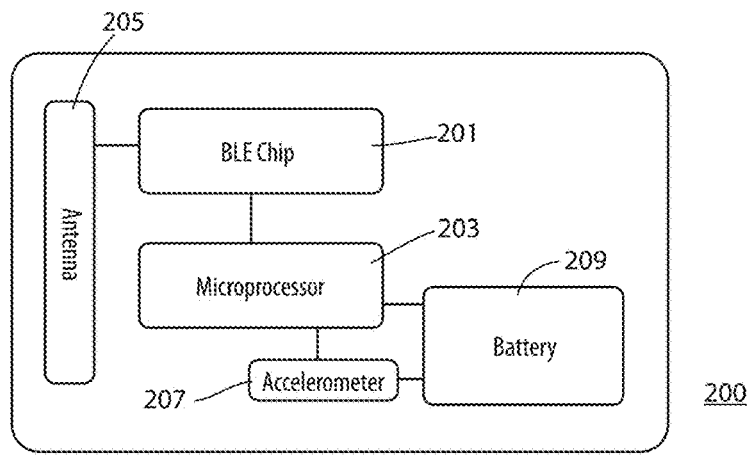
FIG. 2 is a block diagram illustrating components used in the tag.

FIG. 2 is a block diagram illustrating system components used in the tag. The tag 200 includes a low energy BLE transceiver 201 that works to transmit and receive Bluetooth radio frequency (RF) signals. The BLE transceiver 201 is connected to a microprocessor 203 for controlling the operation of the transceiver. The BLE transceiver is also connected to an antenna 205 for providing communication to other devices. The tag further includes an accelerometer 207 connected to microprocessor 203 for detecting motion of the tag and a battery 209 for powering electronic components in the device.

Figure 3:
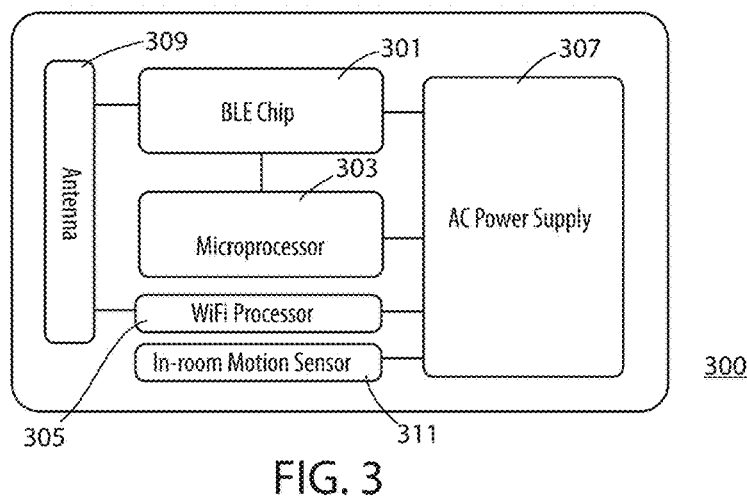
FIG. 3 is a block diagram illustrating components used in the bridge.

FIG. 3 is a block diagram illustrating components used in the bridge as seen in FIG. 1. The bridge 300 includes one or more BLE transceivers 301 that connect to a microprocessor 303 for controlling operation of the transceiver(s) 301. A Wi-Fi processor 305 also connects to the processor 303 for transmitting and receiving Wi-Fi signals. An AC power supply 307 is connected to the BLE transceiver 301, microprocessor 303 and the Wi-Fi processor 305 for powering these devices. The AC power supply 307 may include components for retention of some energy even after being unplugged for some time period. An antenna 309 is connected to both the BLE transceiver 301 and the Wi-Fi processor 305 for transmitting and receiving BLE and Wi-Fi RF signals to these devices at the appropriate frequency. The bridge 300 includes an optional in-room motion sensor 311, such as a Passive-Infrared sensor, which detects human motion in the room where the bridge is located, by tracking changes in the infrared radiation in the room. The bridge 300 having a motion sensor 311 can determine the timing of any moving objects in its same room, which helps populate a system database of which rooms have moving objects at what time. This data can then be transmitted and/or stored in a database for correlation to motion status of one or more tags.

Figure 4:
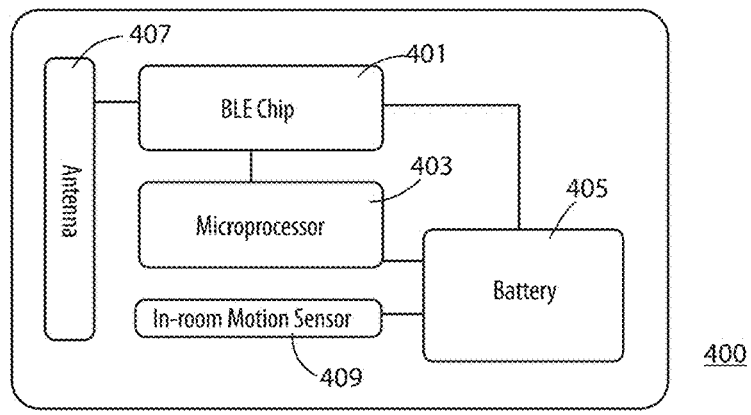
FIG. 4 is a block diagram illustrating components used in the beacon with an included motion sensor.

FIG. 4 is a block diagram illustrating components used in the beacon. The beacon 400 includes components for transmitting BLE advertisements and includes one or more BLE transceivers 401 that connect to a microprocessor 403 for controlling the transceiver(s). A battery 405 connects to the BLE transceiver(s) 401 and the microprocessor 403 for powering these devices. As described herein, the beacon 400 typically is placed on the ceiling of a room. The beacon 400 includes one or more antennas 407 for providing gain, possibly to mitigate multipath fading between the tag and the beacon antenna. The beacon 400 includes an in-room motion sensor 409, connected to both the microprocessor 403 and battery 405. As an example, the motion sensor may be a Passive-Infrared sensor, which detects human motion in the room where the bridge is located, by tracking changes in the infrared radiation in the room. Thus, the beacon 400 having a motion sensor 409 can determine the timing of any moving objects in its same room, which helps populate a system database of which rooms have moving objects at what time. This data will then be transmitted to the bridge 1500 and/or stored in a database for correlation to motion status of one or more tags.

Figure 5:
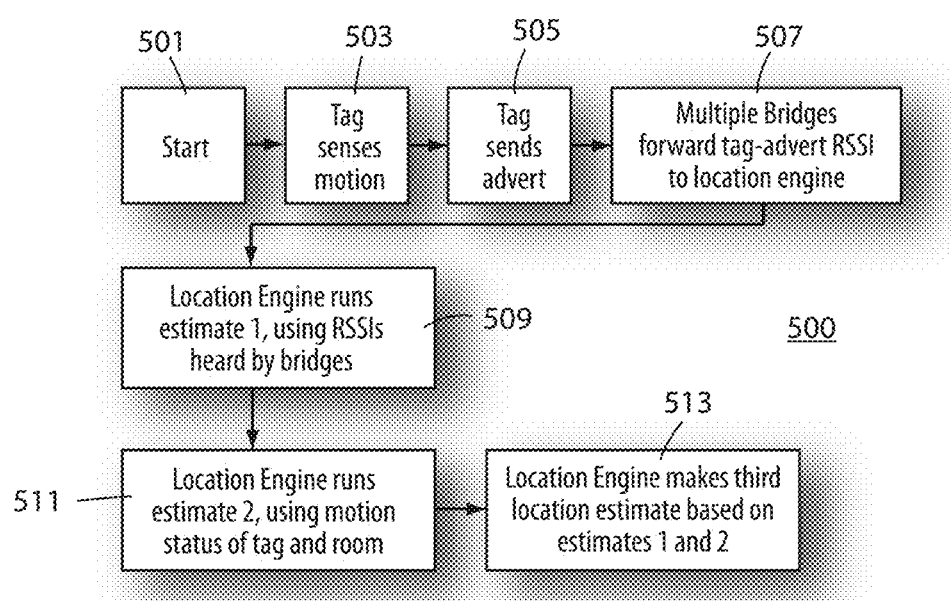
FIG. 5 is a flow chart diagram illustrating the steps using the tags, bridges and location engine server to estimate tag location.

FIG. 5 is a block diagram illustrating a method in using the tags, bridges and location engine server to estimate tag location. The method 500 starts 501 where a tag, using its accelerometer, senses motion 503. The tag then sends an advertisement 505, reporting its motion status as sensed by its accelerometer. Multiple bridges measure the characteristics of the tag advertisements they receive; characteristics that include at least the received signal strength (RSSI). Multiple bridges forward the tag advertisement's reported motion status and RSSI to a location engine 507, as is common in the industry. The location engine initially estimates position of the tag by using the RSSI measurement 509. Thereafter, a second estimate can be calculated that uses matching of coincident motion statuses: that is, matching the timing of the detection of motion by a bridge or beacon in a particular room 513, (the history of which is stored in a location-engine-based room-motion-history database), to the coincident timing of motion-status changes of the tag. For example, if a tag's history of motion status shows that it was moving but stopped at time "x", and only room "y" in a candidate list of rooms showed a coincident history of motion at time "x", the second estimate may locate the tag in that room "y" because of a match in coincident motion. Finally, a third location estimate is made by the location engine based on both the RSSI measurement (the first location estimate) and the motion detection by the bridges, beacons and tags (the second location estimate).

Again, using an example where numerous pieces of clean or soiled equipment are placed on shelves in different rooms with the tags in all orientations along the same wall, the system and methods described herein offer distinct advantages over the prior art. In use, radio signals sent by a tag to the multiple bridges will suffer from a variety of polarity fades (mismatches between the polarity of the transmitting antenna on the tag and the receive antenna on the bridge). These polarity fades work to dispel the general assumption that the RSSI of the advertisement from the tag to the bridge is directly correlated to the distance between the tag and the bridge. Therefore, this adds error to the location estimate. In addition, some of the tags will be blocked (by metal objects or other assets) from a clear line of sight to the one or more bridges, further breaking the correlation of signal strength to distance. Some of the tags will have their radio energy absorbed by human bodies or bags of liquid, further breaking the relationship of signal strength to distance. The tag may be placed in a location where it happens to suffer from a persistent multipath fade relative to a specific bridge, so that bridge will mis-estimate its distance to the tag. Finally, all of these radio fading effects are time-varying, as people and metal objects move through the hospital's rooms, so using radio signal strength alone to estimate the location of an asset tag will make a stationary asset appear to move from time to time.

All of these radio-fading effects make it very difficult to estimate which room each of the assets are placed. Asset tags that are on the clean-room shelf are placed only a few inches from the wall that is shared with the soiled room. Assets in the soiled room are placed only a few inches on the other side of the wall. The clean assets are less than 1 foot from the soiled assets on opposite sides of the wall. Radio signals travel through walls relatively unimpeded. If the RTLS location algorithm has 1-meter accuracy ninety percent (90%) of the time, then the algorithm will fail to estimate the correct location of all assets. Hence, those skilled in the art will reach the conclusion that radio signal strength alone is insufficient for determining which room an asset is placed in, even if it is 1-meter accurate or half-meter accurate. Signal strengths are bothered by too many radio fading effects.

The present invention uses motion sensors to help determine which room a tag is located. Motion sensors have a relative advantage in that they perceive the motion inside a room, but they are shielded (by the wall) from sensing any motion in the adjacent room. In using the system and methods of present invention, the beacon inside the clean-storage room has a motion sensor, e.g. a passive infrared (PIR) sensor. The beacon inside the soiled-storage room has its own motion sensor. Each motion sensor can detect motion of assets or people inside its room, and detect lack of motion, and perhaps detect the difference between limited motion (like a patient sitting in a chair) and walking motion. Neither motion sensor can sense any motion on the opposite side of the shared wall.

With the present invention, each beacon in each room sends a regular advertisement. When the beacon senses no motion in its room, it includes that no-motion status data in its advertisement. When the beacon senses motion in its room, it includes that motion-sensor reading in its advertisement. The beacon may also declare its motion-sense-status as more like a patient sitting in a bed, or more like a human walking through the room, for further accuracy of tag-location fixes. Further, using the system and method of the present invention, bridges are placed throughout the floor plan within receive range of each beacon. Therefore, the bridge can hear and relay to the location engine, advertisements from the beacon that inform the location engine of the motion status in each beacon's room. The location engine builds up a history of the motion patterns in each room of the hospital, which may be stored in a database. In particular, the location engine records timestamps of motion-status changes in each room, such as when a room transitions from "no motion" to "walking motion"—which it may interpret as a human walking into an otherwise quiet room. Since motion-status changes in one room are likely to be non-coincident with motion-status changes in an adjacent room, each room will have a unique "motion fingerprint" for its last few minutes of observed time.

In the system and method described herein, each tag contains an accelerometer. The tag always knows when it is moving, when it is not moving, and when it transitions from movement to stopped, with some sense of the pace of movement. Bridges or gateways can determine when a tag starts or stops moving, either explicitly because the tag includes it in a transmitted message, or implicitly because a tag transmits at a different rate when it is moving.

Further, according to the system and methods of the present invention, the location engine may execute three separate methods or algorithms. The first is a radio signal-strength (RSSI) algorithm. However, as described herein, the RSSI by itself is insufficient for determining which room all assets may reside. The algorithm can, however, determine a set of rooms that are possible/candidate locations. Thus, a second location algorithm is employed. The location engine uses its knowledge of the timestamps of motion changes in all rooms near where the first location algorithm has estimated the tag location. The second algorithm compares the tag's report of motion changes e.g. "I was moving at walking speed, and I stopped at this time" to the reported motion-status changes of three or four rooms in the vicinity of the tag. This is used to determine which room has the best match to that motion history. Room A may have had zero motion throughout that timeframe, Room B may have had limited motion throughout the timeframe, but Room C saw a coincident transition from "walking motion" to "no motion". Therefore, this second algorithm estimates that a person brought the asset into room C, put it on a shelf, and left the room. The third location engine then blends the estimate from the first and second location algorithms with some algorithmic information on room-to-room transitions that are most likely (such as "hallway" to "room"), to provide a final estimate of the room-location of each asset.

By way of example, if a clinical employee at a hospital were bringing an asset into a clean storage room and places the asset on a shelf, at the shared wall between the clean and soiled storage room where the employee leaves the asset, the system and methods according to the present invention can quickly locate the asset because the RTLS architecture places a beacon at the doorway or ceiling of each room. If the RTLS used only radio signal strength to determine location of the asset, the signal between a beacon and the asset tag in the same room may be blocked by metal objects, reduced by polarization effects, or faded by multipath interference, to the point where the asset tag hears a beacon in an adjacent room more strongly than it hears the beacon in its own room. Thus, the RTLS using only radio signal strength will provide inaccurate locations or mis-estimates of the asset. Thus, when using only RSSI measurements, if there were numerous assets lined up on the shelves on both sides of the wall, it is likely that many of the The motion sensor 409 attached to a beacon 400 may be able to discriminate multiple statuses of motion, for example it can distinguish between no motion, the motion of a patient sitting in a bed or chair, and the motion of a human walking in a room. The tag's accelerometer also can discriminate between no motion, partial-body motion, and walking motion. These multiple statuses of motion establish data points to help tags determine whether location changes have occurred for personnel-tracking. The motion of a patient sitting in a bed or chair will not fool the tag into giving erroneous data that it has moved, but instead the tag will be correlating room-changes to the walking motion i.e. the perceived coincidentally in the tag's accelerometer and the beacon's motion sensor.

Hence, the location engine in the current invention uses at least three algorithmic method and/or processes in series to estimate the location of a tag. These processes include:

1) Measurements of the signal strengths of tag advertisements, received by the bridges, employing proximity or trilateration analysis and motion-history analysis, to estimate room location from messages transmitted by the tag, as is common in the industry.

2) Each beacon will advertise the motion status as perceived by its motion sensor, and each bridge report the motion-status of each beacon it hears, allowing the location engine to develop history of motion perceived in each room. Optionally, the bridge may have a motion sensor, and the bridge may add information on the motion status it sees in its room. The location engine can combine history of motion patterns in each room with the patterns of accelerometer-determined motion changes from individual tags, to estimate the room location of a tag.

3) Finally, the tag or location engine blends its room-location estimates from the two algorithms above to finalize its location estimate for the tag.

Various embodiments of the present invention are further directed to a real-time location system (RTLS) and more particularly to a Bluetooth Low Energy (BLE) RTLS having simple transmitting tags, bridges, and beacons. To determine which room a tag is in, beacons broadcast BLE advertisements containing motion-status information about recent history of perceived motion in a room as determined from a motion sensor in the beacon. Bridges forward the beacon advertisements they hear to a location engine, which records timestamps of motion events seen by each beacon in each room. Simple transmitting tags report their own motion status based on a tag-based accelerometer. A series of location-engine steps estimates the room-location of the tags based on a specific combination of RSSI analysis, and a comparison of tag-motion history to the perceived and recorded motion-status in a room. The analysis of tag-motion history and motion-in-room status produces a better estimate of room-level location of the tag than can be estimated by simple proximity or multi-lateration using radio signal strength alone.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A real-time location system (RTLS) having tags, beacons, bridges, and a central location server for providing people and asset tag locating, comprising:

at least one beacon for transmitting Bluetooth low energy (BLE) advertisements, equipped with a motion sensor and transmitting motion status sensed at a beacon location;

at least one bridge for receiving BLE advertisements from the at least one beacon such that the BLE advertisements include motion-status information for the location where the beacon is mounted and forwarding the BLE advertisements to a location engine server, and further where the at least one bridge receives radio transmissions from at least one tag and measures characteristics of the received tag transmissions, including received signal strength; and optionally equipped with a motion sensor for determining motion status in the bridge's room;

at least one tag for wirelessly transmitting its identification to the at least one bridge, where the at least one tag includes an accelerometer for reporting its motion status to the at least one bridge and a location engine server;

a central location-engine server utilizing a plurality of location-determining methods comprising:

a first location method for calculating a first location estimate for the at least one tag, based on characteristics of advertisements transmitted by the at least one tag, received by a fixed infrastructure of bridges, and transmitted to the central location server;

a second location method for calculating a second location estimate for the at least one tag, based on comparing changes in the history of motion status in the beacons' rooms, optional changes in the history of motion changes in the bridges' rooms, coincident changes in the received signal strength of advertisements from tags, and the coincident history of changes in accelerometer-determined motion status of one or more tags that are likely in the room; and a third location method for combining the first and second location estimates to determine a location result for the at least one tag.

2. The RTLS as in claim 1, wherein the at least one tag further comprising:

a BLE transceiver;

a microprocessor for driving the BLE transceiver; and a battery for powering the transceiver.

3. The RTLS as in claim 1, wherein the at least one beacon comprising:

a BLE transceiver, a microprocessor for operating the transceiver, a motion sensor for detecting motion in the beacon's room;

a battery for powering the BLE transceiver and the microprocessor; and at least one antenna.

4. The RTLS as in claim 1, wherein the at least one bridge comprising:

a BLE transceiver;

a Wi-Fi transceiver, a microprocessor for operating the transceivers; and an optional motion sensor for detecting motion in the bridge's room.

5. An RTLS as in claim 1, wherein the bridge reports the recent history of motion-status in its room to the location engine, and the bridge reports the recent history of motion status in each beacon's room as heard in the beacon advertisements of nearby beacons, and thereby the location engine may build a movement-history database record for various rooms, to be used in locating tags.

* * * * *